United States Patent [19]

Suzuki et al.

[11] 4,117,721
[45] Oct. 3, 1978

[54] MAGNETIC FLOWMETER

[75] Inventors: Kazuie Suzuki; Takashi Torimaru, both of Tokyo; Chuji Akiyama, Yokohama, all of Japan

[73] Assignee: Hokushin Electric Works, Ltd., Tokyo, Japan

[21] Appl. No.: 835,327

[22] Filed: Sep. 21, 1977

[51] Int. Cl.$^2$ .............................................. G01F 1/60
[52] U.S. Cl. ............................................. 73/194 EM
[58] Field of Search .................................. 73/194 EM

[56] References Cited

U.S. PATENT DOCUMENTS

| 3,339,410 | 9/1967 | Steru | 73/194 EM |
| 4,059,014 | 11/1977 | Torimaru | 73/194 EM |

*Primary Examiner*—Charles A. Ruehl
*Attorney, Agent, or Firm*—Michael Ebert

[57] ABSTRACT

A magnetic flowmeter whose electromagnet is excited by a low-frequency excitation current having an a-c component and a d-c component, the flowmeter including flow tube electrodes yielding a flow rate signal. A reference-voltage detecting transformer is provided to produce a reference-voltage proportional to the a-c component of the excitation current. Fluctuations in the flow rate signal as a result of fluctuations in the a-c component of the excitation current are eliminated by dividing the flow rate signal by the reference-voltage signal. In order to eliminate from the reference-voltage detecting transformer the unwanted magnetic flux generated by the d-c component of the excitation current, compensating means are provided to generate a counter magnetic flux, whereby saturation of the transformer core and the resultant distortion of the reference voltage signal are avoided.

10 Claims, 11 Drawing Figures

MAGNETIC FLOWMETER

BACKGROUND OF INVENTION

This invention relates to magnetic flowmeters, and more particularly to a reference-voltage detecting circuit in a magnetic flowmeter whose electromagnet is excited by a low-frequency excitation current.

In order to eliminate unwanted fluctuations from the flow rate signal yielded by a magnetic flowmeter, which fluctuations result from fluctuations in the excitation current for the electromagnet, the general practice is to provide a reference-voltage detecting circuit. This circuit is arranged to produce a reference-voltage proportional to the excitation current, the ratio of this reference-voltage to the flow rate signal being determined by means of a divider.

The reference-voltage is usually derived from the secondary winding of a reference-voltage detecting transformer whose primary winding is interposed in series with the excitation circuit of the electromagnet. This is done in order to isolate the divider from the commercial power line utilized as the source for the excitation current.

When an a-c current having the usual 50 or 60 Hz commercial power line frequency serves as an excitation current source, one has no difficulty in obtaining the reference-voltage from the secondary winding of the reference transformer.

Also known are magnetic flowmeters which make use of a low-frequency excitation wave, such as one whose excitation frequency is well below that of the commercial power line frequency. One can, by means of a low-frequency excitation type magnetic flowmeter, obtain a flow rate signal having an excellent signal-to-noise ratio; for unwanted magnetic coupling and/or electrostatic coupling between the excitation coil and the signal lead wires connected to the flow tube electrodes may be reduced considerably.

A low-frequency excitation type magnetic flowmeter also requires an arrangement for eliminating fluctuations in the flow rate signal resulting from fluctuations in the excitation current. And to this end, a transformer is included in the circuit in order to detect a reference voltage proportional to the excitation current.

When a low-frequency excitation current is produced by chopping the d-c output of a d-c voltage source by an "on-off" controlled switching means, a d-c component is present in the chopped excitation current as the mean value thereof. As a consequence, the magnetic core of the transformer serving to detect the reference voltage is magnetically saturated by this d-c component. Because of such core saturation, the reference voltage derived from the secondary winding of the transformer is distorted and the adverse effect of excitation current fluctuations cannot be fully removed from the flow rate signal.

To overcome this drawback, one could conceivably employ a transformer whose core is so large that it is not subject to magnetic saturation by the d-c component of the excitation current. However, this solution creates another problem; for the size of the reference-voltage detecting circuit then becomes excessively bulky and cumbersome.

Yet another technique for eliminating distortion resulting from the d-c component of the excitation current is by means of switching elements adapted to apply the excitation current in both directions from positive and negative d-c sources. The disadvantage of this technique is that the resultant configuration of the excitation current circuit becomes relatively complex.

SUMMARY OF INVENTION

In view of the foregoing, the main object of this invention is to provide a reference-voltage detecting circuit for a low-frequency excitation type magnetic flowmeter, the circuit functioning to detect the reference voltage without distortion.

Yet another object of this invention is to provide a reference-voltage detecting circuit of simple construction which makes use of a relatively small transformer whose core is subject to saturation, saturation of the core being obviated by means of a compensating magnetic flux.

Briefly stated, in a magnetic flowmeter in accordance with the invention, a compensating current is applied to the compensating winding of the transformer serving to effect reference-voltage detection, thereby eliminating the unwanted magnetic flux caused by the d-c component of the excitation current and the resultant distortion of the reference-voltage. The arrangement is such that changes in a-c magnetic flux generated in the transformer center around the null point of the B-H curve (B is magnetic flux density and H is magnetic field strength).

OUTLINE OF DRAWINGS

For a better understanding of the invention as well as other objects and further features thereof, reference is made to the following detailed description to be read in conjunction with the accompanying drawings, wherein.

DESCRIPTION OF INVENTION

First Embodiment

Figure 1:
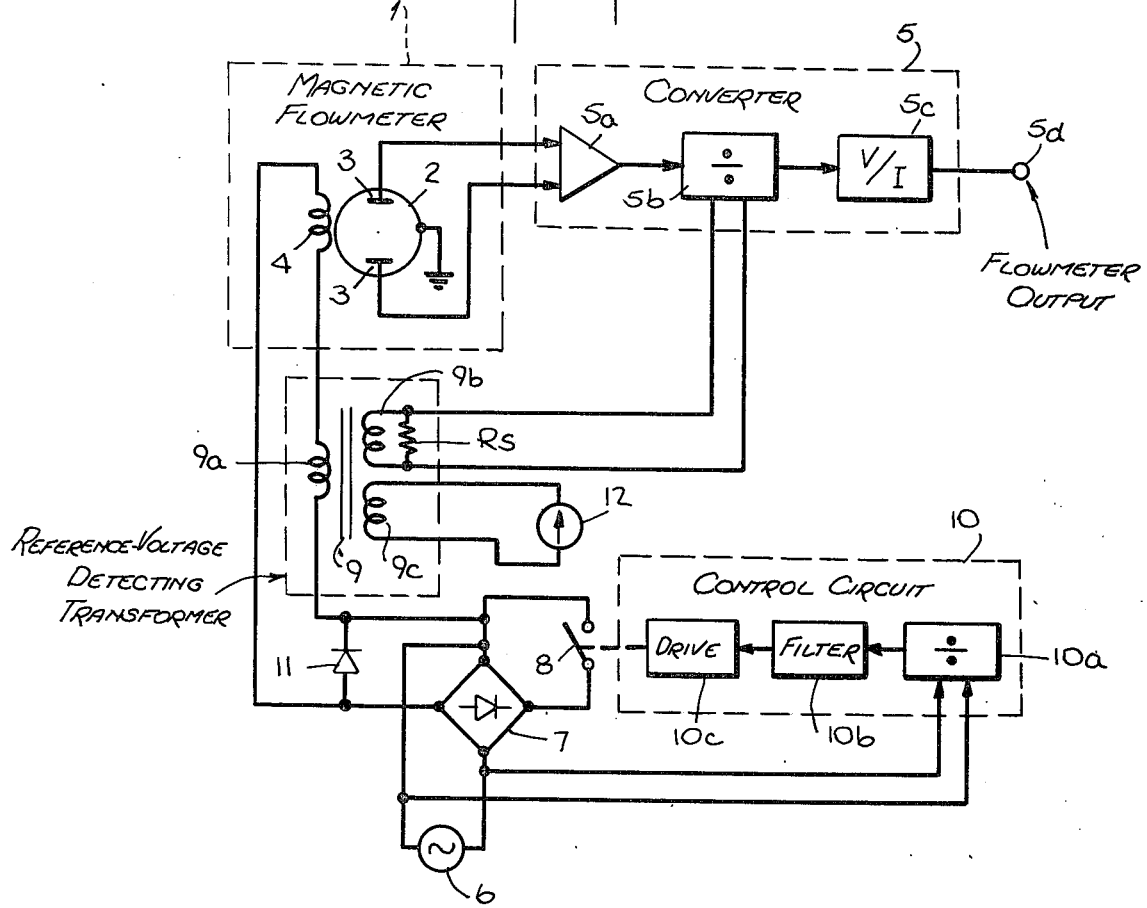
FIG. 1 is a schematic diagram of a first preferred embodiment of a magnetic flowmeter having a reference-voltage detecting circuit in accordance with the invention.

Referring now to FIG. 1, there is shown a low-frequency excitation type magnetic flowmeter having a reference-voltage detecting circuit in accordance with this invention. In this figure, dotted-line block 1 encloses a conventional magnetic flowmeter. The liquid whose flow rate is to be metered is conducted through a flow tube 2 having a pair of electrodes 3 disposed at diametrically opposed positions thereon.

An excitation coil 4 acts to establish a magnetic field within the flow tube whose lines of flux are perpendicular both to the transverse axis passing through electrodes 3 and the longitudinal axis of the tube. A flow rate signal whose voltage is proportional to volumetric flow rate is induced across electrodes 3, and the induced voltage is applied to a converter whose components are contained in dotted-line block 5. Converter 5 comprises an amplifier 5a acting to amplify the flow rate signal to some fixed level and a divider 5b functioning to divide the output from amplifier 5a by a reference signal proportional to the excitation current, thereby eliminating fluctuations from the flow rate signal resulting from fluctuations in the excitation current. Also included in converter 5 is a voltage-to-current converter 5c to which is applied the output of divider 5b. Thus yielded at output terminal 5d is a current signal proportional to the volumetric flow rate.

A commercial power line source 6 is connected to the input junctions of a rectifying bridge 7. The d-c voltage yielded at the output junction of bridge 7 is applied through a switching element 8 to a series circuit constituted by the primary winding 9a of a reference-voltage detecting transformer 9 and the excitation coil 4 of magnetic flowmeter 1. Switching element 8 is "on-off" controlled at a predetermined rate (i.e., 50 or 60 Hz). The rate may correspond to the frequency of a commercial power line frequency 5, as shown by wave form A in FIG. 1a. This rate is represented in wave form A by symbol $t$. This "on-off" switching action is periodically interrupted at a low-frequency rate $1/T$ which is a submultiple of the power line frequency $1/t$ and is just a few Hz.

A control circuit enclosed in dotted-line block 10 acts to actuate switching element 8. This circuit includes a frequency divider 10a to which is applied the voltage from commercial power line source 6, the divider functioning to divide the commercial power line frequency to a low-frequency which is a sub-multiple of the line frequency. The output of frequency divider 10a is applied through a filter 10b to a switch-driver 10c, thereby periodically interrupting its driving motion at the desired low-frequency rate.

A diode 11 connected in parallel to the excitation-current circuit serves to discharge energy whfich is induced in excitation coil 4 when switching element 8 is in its "off" state.

Figure 1A:
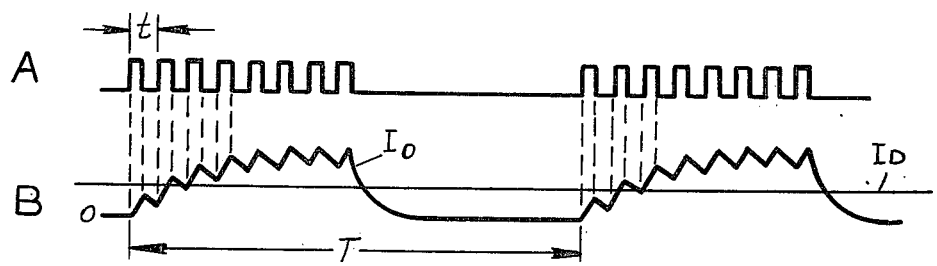
FIG. 1a shows wave forms A and B representing the low-frequency current that is utilized as an excitation current for the magnetic flowmeter.

A reference voltage proportional to the excitation current $I_o$, as shown by wave form B in FIG. 1a, is yielded across both ends of a resistor $R_s$ connected to the secondary winding 9b of reference-voltage detecting transformer 9. This reference voltage is applied to divider 5b in converter 5, whereby the ratio of the reference signal to the detected flow signal is determined so as to eliminate from the detected flow rate signal the undesirable influence of the fluctuations in excitation current $I_o$.

As previously described, the problem encountered in a conventional low-frequency excitation type magnetic flowmeter is that the magnetic core of reference-voltage detecting transformer 9 becomes saturated by the d-c component ID in excitation current $I_o$, the d-c component being the mean value thereof. As a consequence, the reference-voltage obtained across both ends of resistor $R_s$ is distorted. It is therefore difficult to carry out accurate dividing operations at divider 5b; hence fluctuations included in the excitation current cannot be entirely removed from the detected flow rate signal.

In accordance with the present invention, means to generate a compensating magnetic flux is provided in reference-voltage detecting transformer 9 in order to eliminate the unwanted d-c magnetic flux generated by d-c component ID included in excitation current $I_o$.

This compensating magnetic flux means is constituted by a circuit formed by a constant-current generating source 12 and a tertiary winding 9c included in reference-voltage detecting transformer 9. In this circuit, the constant current from constant-current generating source 12 flows through tertiary winding 9c to generate a compensating magnetic flux countering the magnetic flux generated by the d-c component included in excitation current $I_o$. Thus changes in the magnetic flux resulting from the a-c component of excitation current $I_o$ are caused to center around the null point on the B-H curve characteristic of the core in transformer 9.

With an arrangement of the type shown in FIG. 1, a reference-voltage free from distortion and having a wave form coinciding with that of the excitation current can be obtained across both ends of resistor $R_s$ connected to secondary winding 9b. Thus the influence of fluctuations in excitation current $I_o$ on the detected flow rate signal can be removed completely without using a reference-voltage detecting transformer whose size is large enough to avoid saturation.

Second Embodiment

Figure 2:
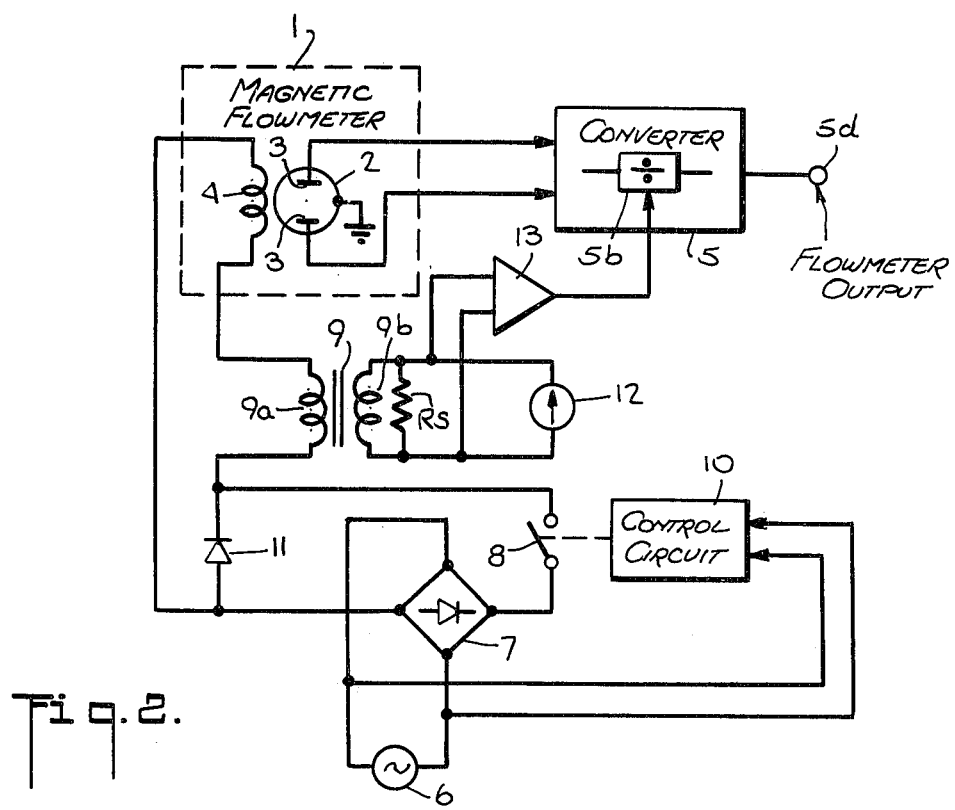
FIGS. 2 to 10 are schematic diagrams, respectively showing the second to the tenth embodiments of the invention.

FIG. 2 shows another embodiment in accordance with this invention. In this embodiment, the tertiary transformer winding 9c included in the first embodiment is omitted, and in place thereof, constant-current generating source 12 is connected directly to secondary winding 9b. As a consequence, the unwanted magnetic flux generated by the d-c component included in the excitation current is eliminated by the compensating current flowing through the secondary winding. The a-c component induced in secondary winding 9b appears across both ends of resistor $R_s$, and is detected by an amplifier 13 having a high input impedance. The output of amplifier 13 is applied to divider 5b included in converter 5.

With this configuration, the reference-voltage, which is free from distortion and whose wave form conforms to that of the excitation current, can be obtained in the same manner as in the first embodiment.

Third Embodiment

In the first and second embodiments, the arrangement is such that a compensating current corresponding to the d-c component in the excitation current is derived from constant-current source 12 and applied to secondary winding 9b or to tertiary winding 9c included in the reference-voltage detecting transformer 9, so as to eliminate unwanted fluctuations resulting from the d-c component in the excitation current. There are occasions, however, when the d-c component ID in excitation current $I_o$ is varied by fluctuations in the commercial power line source 6 or by impedance variations in excitation coil 4 as a result of temperature variations.

Figure 3:
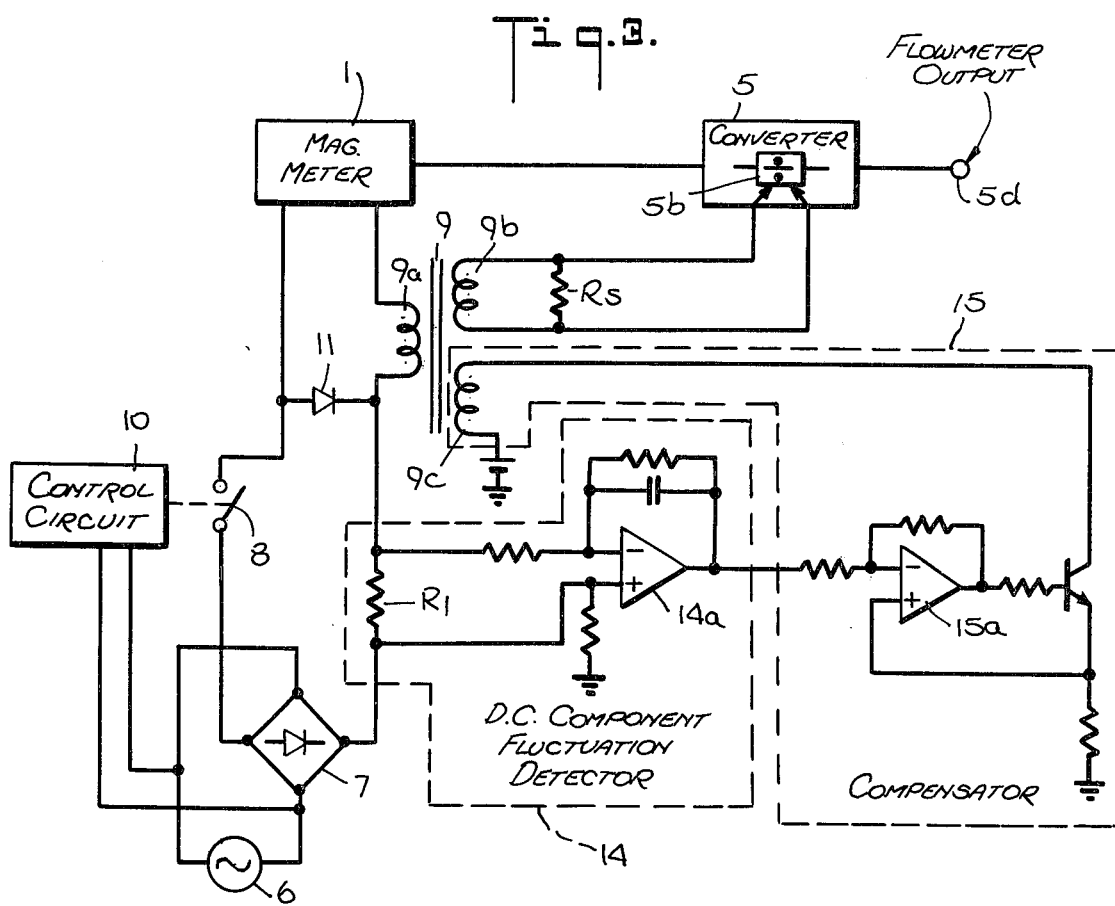

To correct for these variations, the embodiment disclosed in FIG. 3 is provided with additional compensating means to detect variations of d-c component ID included in excitation current $I_o$, the circuit serving to vary the amount of the compensating current in accordance with variations of d-c component ID.

In FIG. 3, the same reference numerals as those in FIGS. 1 and 3 are used to designate identical components and, to avoid duplication, no explanation will be made as to these components. In the fourth embodiment, enclosed in block 14 are means to detect fluctuations in the d-c component included in the excitation-current. Also provided are the means enclosed in block 15 functioning to control the compensating magnetic flux in accordance with the detected signal derived from d-c component fluctuation detector 14, compensator 15 acting to render zero at all times the magnetic flux generated by the d-c component ID in the excitation current.

Detector 14 may, for example, be constituted by a resistor $R_1$ inserted in series with the excitation current circuit, and a filter circuit 14a which acts to smooth the voltage generated across both ends of resistor $R_1$. The output of filter 14a is applied to compensator 15 to control the compensating magnetic flux.

Compensator 15 is constituted, for example, by a d-c amplifier 15a and the tertiary winding 9c of transformer 9, one end of this winding being connected to the output of amplifier 15a. The output current of d-c amplifier 15a is varied in accordance with the increase or decrease of the output of filter circuit 14a, thereby controlling the compensating magnetic flux generated by the tertiary winding.

With the arrangement shown in FIG. 3, the compensating magnetic flux is controlled in accordance with fluctuations of the d-c component included in the excitation current, thereby avoiding distortion of the reference-voltage by reason of fluctuations in the d-c component in the excitation circuit.

Fourth Embodiment

Figure 4:
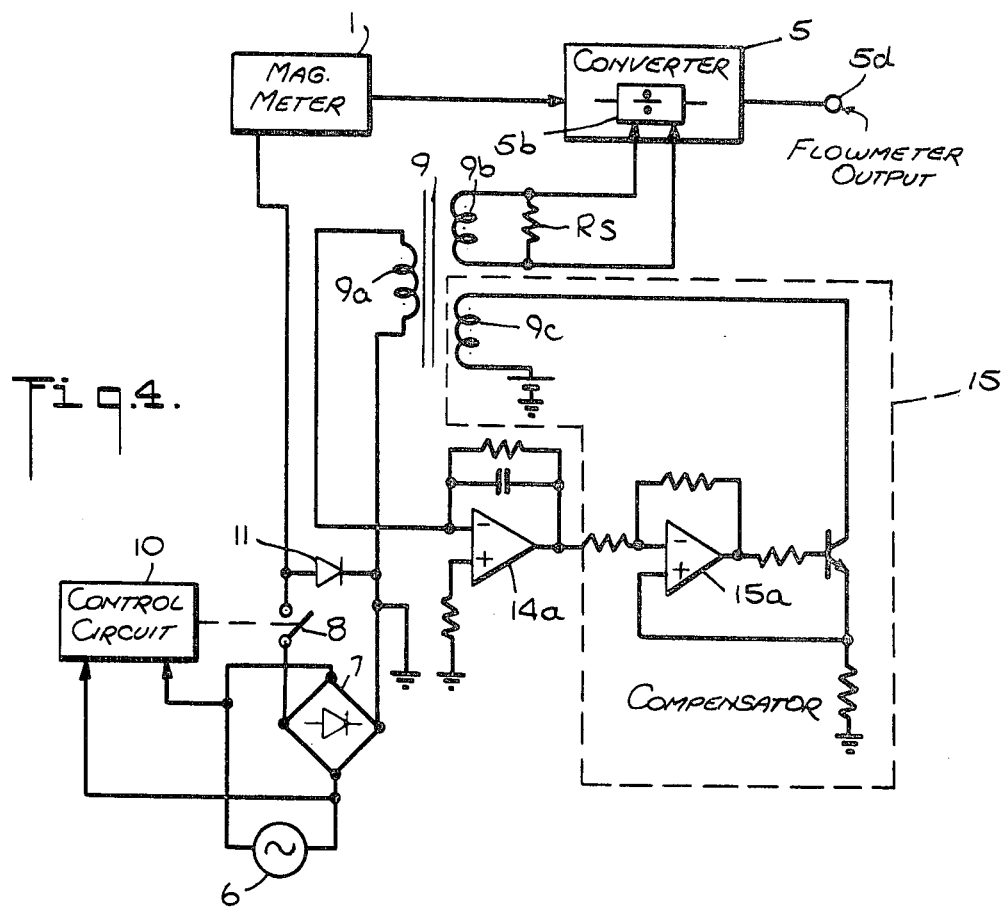

While in FIG. 3 resistor $R_1$ serves to detect the excitation current, it is also possible to use a technique as shown in FIG. 4, wherein the voltage drop in primary winding 9a of the reference-voltage detecting transformer 9 is sensed directly by filtering amplifier 14a, the filtered output therefrom being applied to d-c amplifier 15a of compensator 15 whose output goes to tertiary winding 9c of the transformer.

Fifth Embodiment

Figure 5:
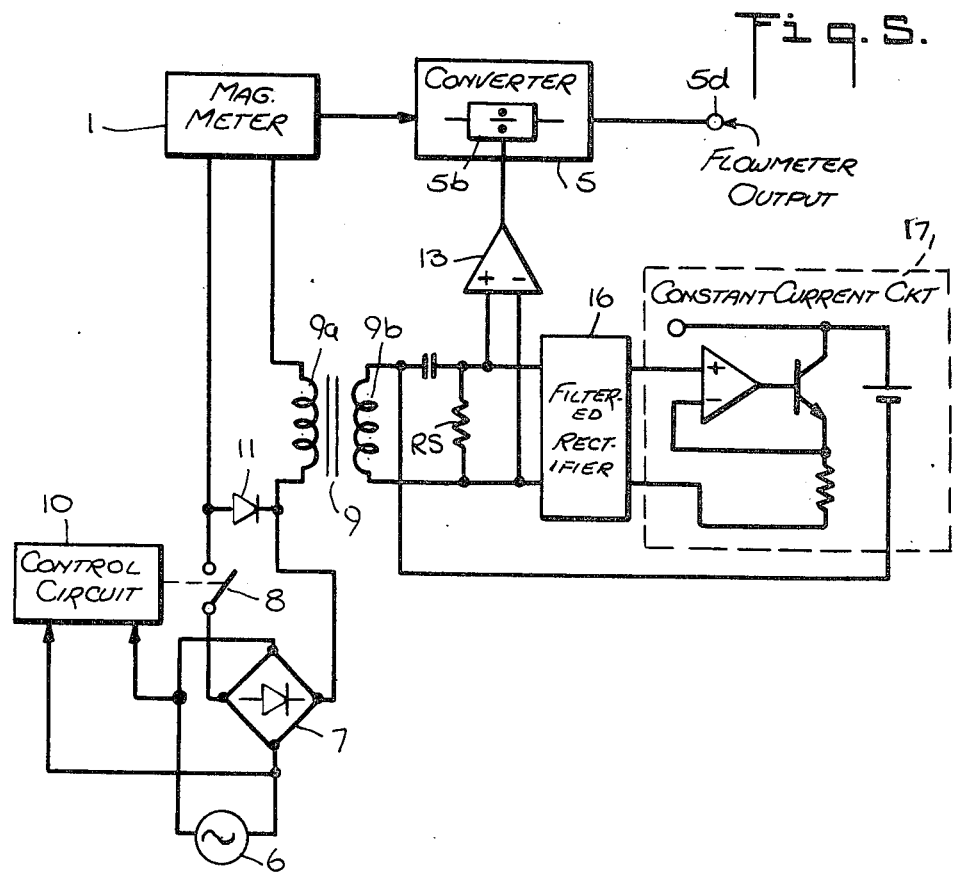

FIG. 5 shows still another embodiment of the invention in which both the reference voltage and fluctuations of the excitation current are detected by means of secondary winding 9b. The reference-voltage is detected by a high-input impedance amplifier 13, and fluctuations of the d-c component included in the excitation current are detected by a rectifying-and-filtering circuit 16.

The output of circuit 16 is applied to a constant-current circuit 17, thereby controlling the intensity of the output current produced by circuit 17. The output of constant-current circuit 17 is supplied to secondary winding 9b so as to eliminate the unwanted magnetic flux generated by the d-c component included in the excitation current.

Sixth Embodiment

Figure 6:
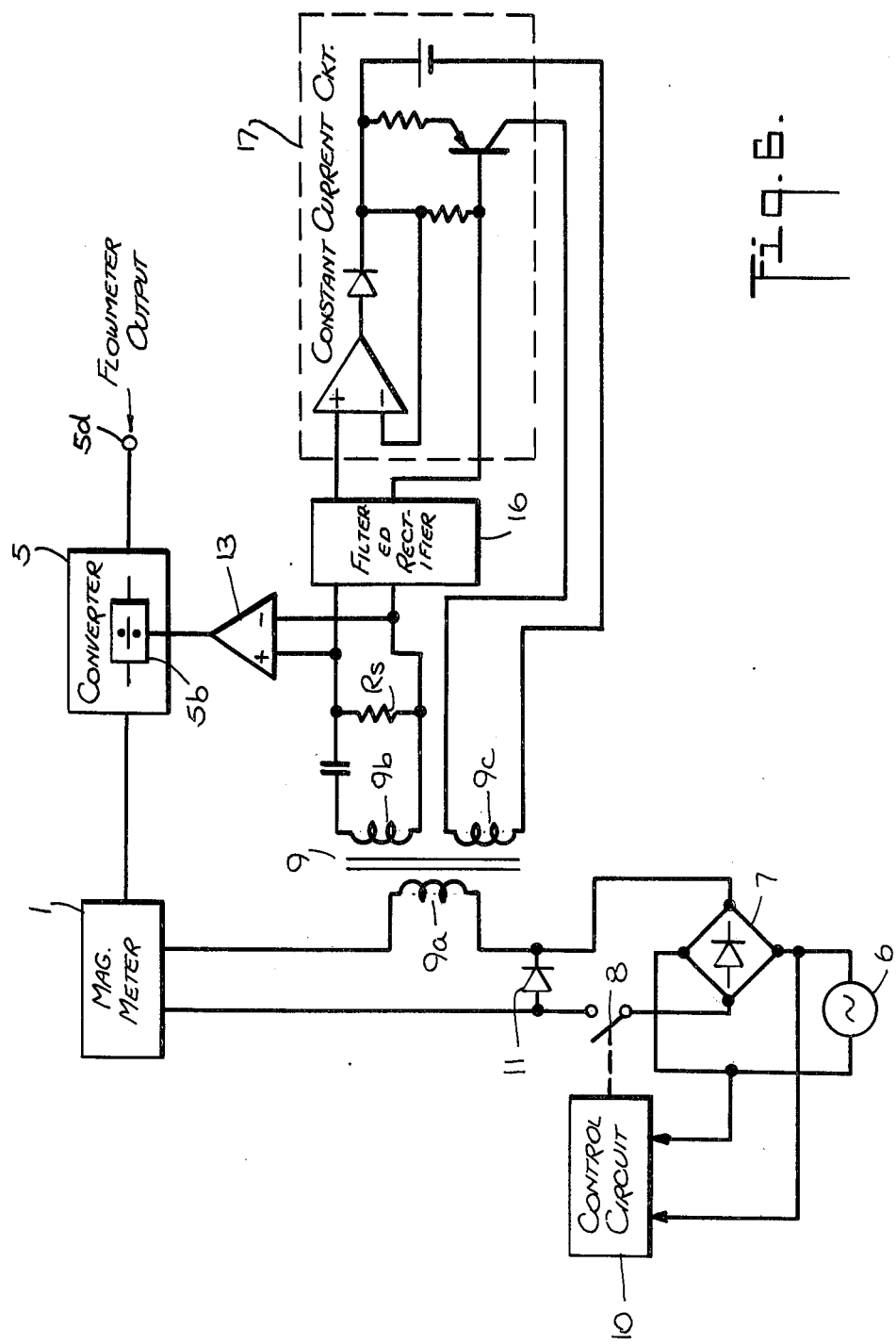

FIG. 6 shows still another embodiment of the invention in which the output of constant-output circuit 17 is applied to tertiary winding 9c of transformer 9, the arrangement and operation otherwise being similar to that in FIG. 5.

Seventh Embodiment

Although, in the above-described embodiments, fluctuations in the excitation current are detected by measuring the voltage drop or current variations in the excitation current circuit, or by measuring voltage variations which take place in secondary winding 9b of the reference-voltage detecting transformer 9, it is also possible to detect fluctuations in the excitation current by measuring the voltage or current variations which occur at the commerical power line source serving to supply power to the excitation current circuit.

Figure 7:
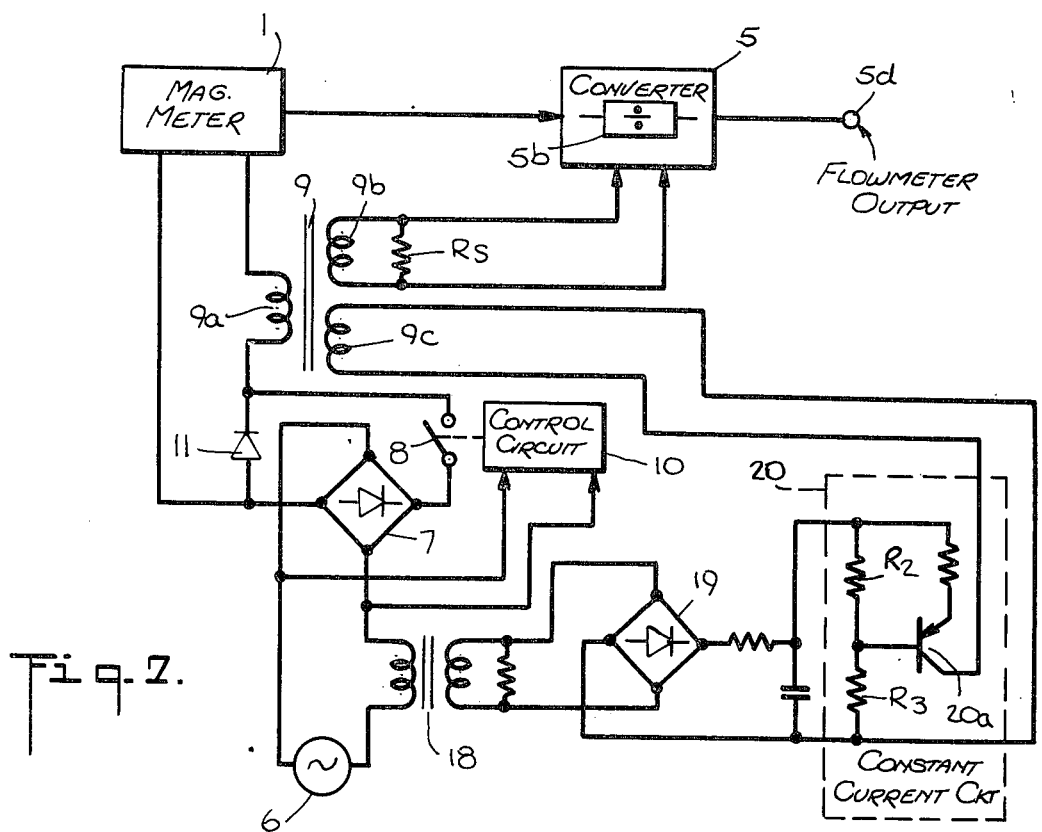

FIG. 7 shows an embodiment in accordance with this invention which exploits this technique. A current-detecting transformer 18 is interposed between the input junctions of rectifying bridge 7 and the commercial power line source 6. Fluctuations in the excitation current are derived from the secondary winding of transformer 18. The detected output of this secondary winding is then applied to a rectifying bridge 19 and is thereby converted into a d-c voltage signal which is fed to constant-current circuit 20.

Constant-current circuit 20 is constituted by a transistor 20a and resistors $R_2$, $R_3$ which form a voltage-dividing circuit. The d-c voltage from rectifying bridge 19 is divided by the voltage-divider and the divided voltage generated at the junction of resistors $R_2$, $R_3$ is applied to the base of transistor 20a so as to vary the impedance between the emitter and collector thereof. The output of constant-current circuit 20 is applied to tertiary winding 9c of reference-voltage detecting transformer 9.

With this configuration, inasmuch as the detected signal representing fluctuations of the excitation current can be obtained in the form of a signal having the commercial power line frequency, a conventional transformer may be used as transformer 18.

Eighth Embodiment

Figure 8:
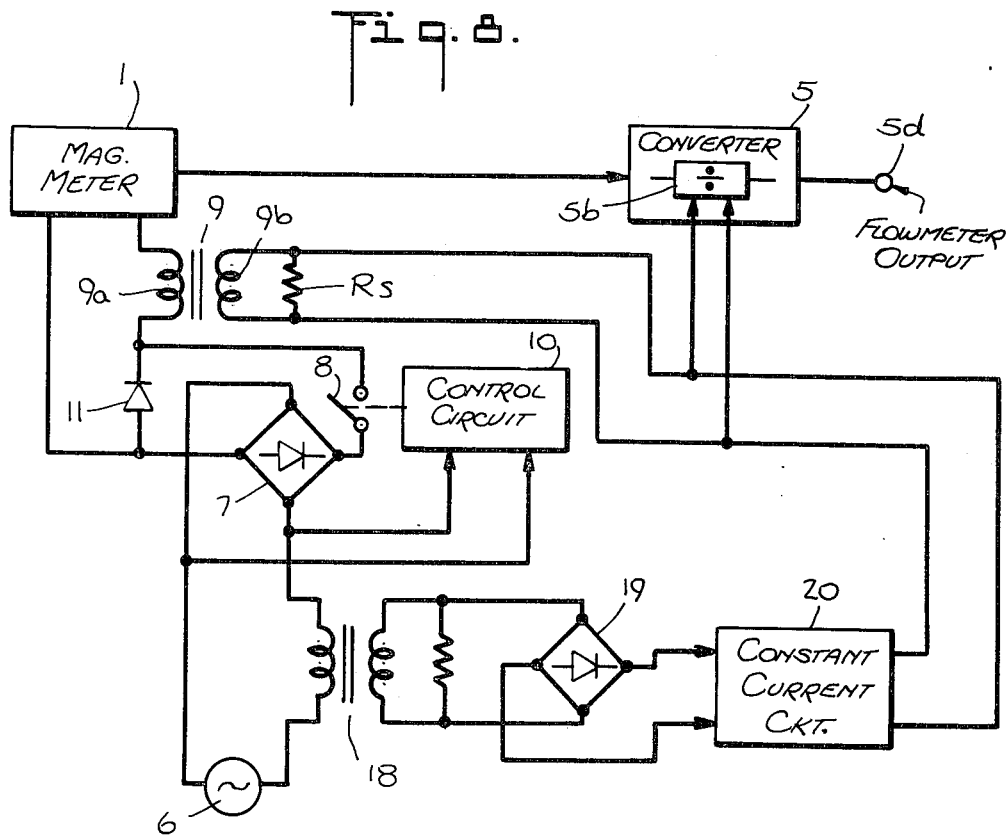

FIG. 8 shows another embodiment in accordance with the invention. In this embodiment, the output of constant-current circuit 20, whose details and function were explained in connection with FIG. 7, is applied to secondary winding 9b of the reference-voltage detecting transformer 9. In this instance, therefore, secondary winding 9b is used for both detecting the reference voltage and generating the compensating magnetic flux.

Ninth Embodiment

Figure 9:
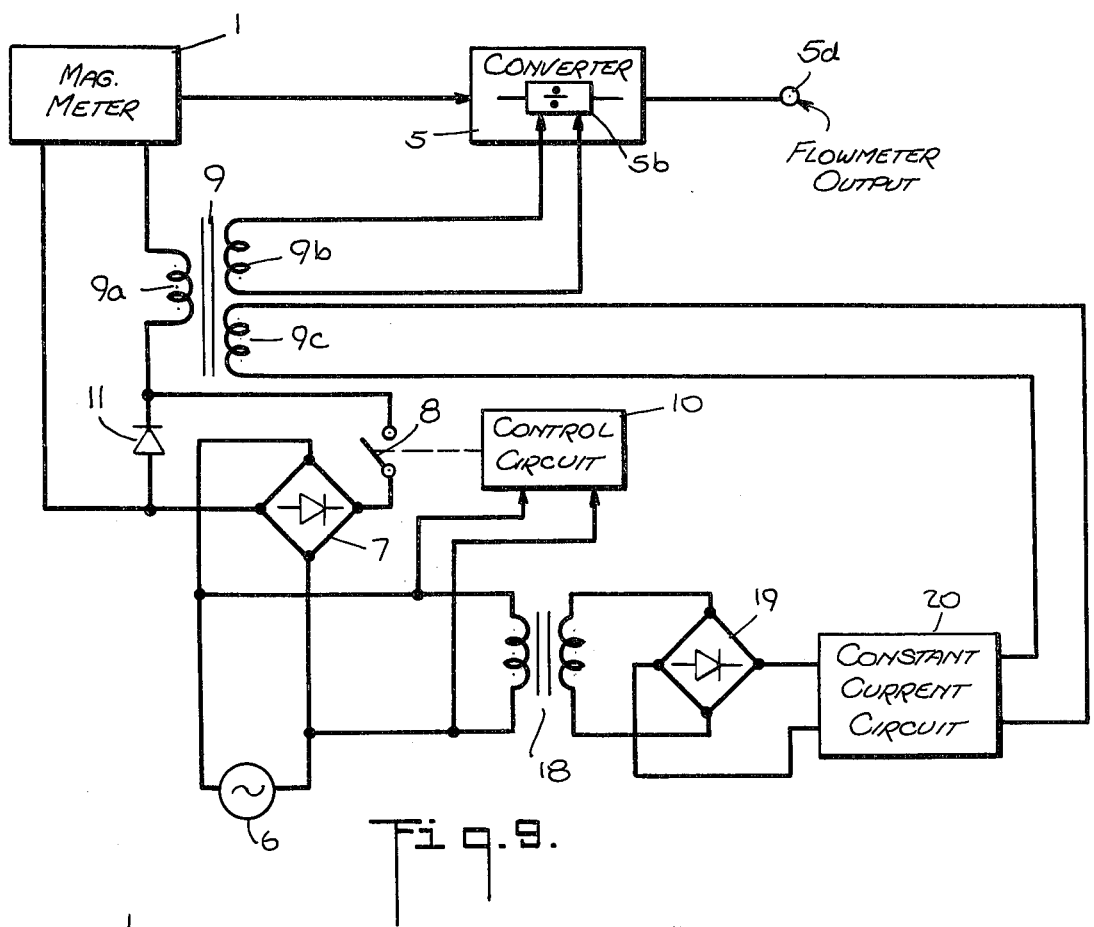

FIG. 9 shows still another embodiment of the invention. In this embodiment, the voltage variations of the commercial power line source 6 are measured in order to detect fluctuations in the excitation current. That is, the voltage variations of the commercial power line source 6 are detected by transformer 18, and the detected output thereof is converted into a d-c signal by rectifying bridge 19. The output signal from bridge 19 is then applied through constant-current circuit 20 to tertiary winding 9c of reference-voltage transformer 9.

Tenth Embodiment

Figure 10:
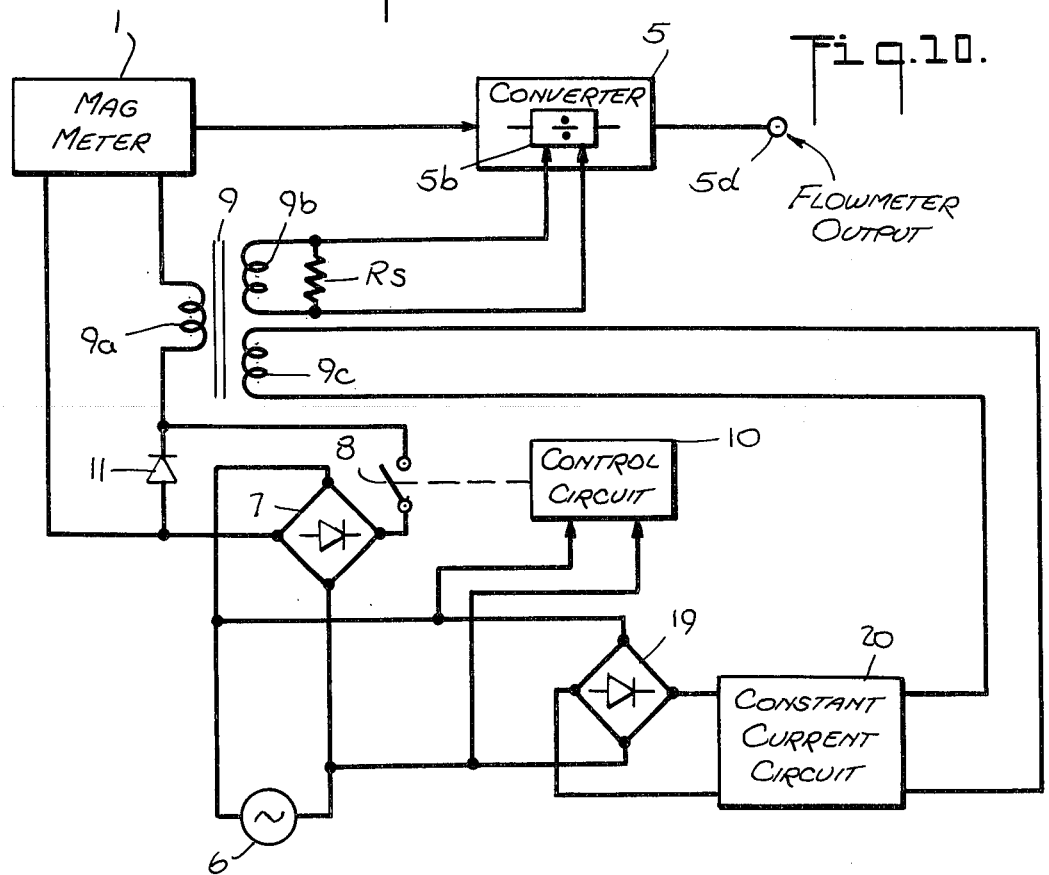

FIG. 10 shows yet another embodiment in accordance with this invention, wherein rectifying bridge circuit 19 is connected directly to the commercial power line source 6. In this case, since converter 5 must be isolated from the commercial power line source, the output of constant-current circuit 20 must be applied to the tertiary winding 9c of the transformer.

As explained previously, since the invention makes it possible to obtain an accurate reference-voltage, and this reference-voltage is used to remove fluctuations from the excitation current in a low-frequency excitation type magnetic flowmeter, the adverse effects of fluctuations in the excitation current can virtually be eliminated from the detected flow rate signal.

Further, since the reference-voltage detecting transformer 9 is so constructed as to eliminate the d-c magnetic flux generated therein by the d-c component included in the excitation current, the magnetic flux generated by the a-c component in the excitation current is the sole operative factor which gives rise to an output signal from the flowmeter at terminal 5d which accurately reflects the flow rate being metered. Hence the core structure may be made small, thereby reducing the overall size of reference-voltage detecting transformer 9.

While there have been shown and described preferred embodiments of a magnetic flowmeter in accordance with the invention, it will be appreciated that many changes and modifications may be made therein without, however, departing from the essential spirit thereof.

We claim:

1. In combination with a magnetic flowmeter in which the fluid to be metered is conducted through a flow tube having detecting electrodes therein, the fluid intercepting a magnetic field produced by an electromagnet to induce a flow rate signal in said electrodes, a system comprising:
   A. circuit means to supply to said electromagnet a low-frequency excitation current having an a-c component and a d-c component;
   B. a reference-voltage detecting transformer having a primary winding interposed in said excitation current supply means and a secondary winding across which is developed a reference voltage proportional to said excitation current, said transformer having a core subject to saturation by the magnetic flux generated by said d-c component;
   C. a converter responsive to said reference voltage and coupled to said electrodes to provide an output flow rate signal in which the influence of fluctuations in said a-c component on the detected flow rate signal is minimized; and
   D. compensating means associated with said transformer to produce a magnetic flux therein which counteracts the effect of the magnetic flux produced by said d-c component, thereby avoiding saturation of said core and the resultant distortion of the reference voltage.

2. A system as set forth in claim 1, wherein said supply means is constituted by a rectifier coupled to an a-c power line whose frequency is at least 50 Hz, the output of said rectifier being coupled through an on-off switch to said electromagnet, and means to actuate said switch periodically to chop the excitation current at a relatively low rate.

3. A system as set forth in claim 2, wherein said actuating means is a driver which operates said switch at a rate corresponding to the power line frequency, said driver being periodically interrupted at said low rate.

4. A system as set forth in claim 3, wherein said driver is interrupted at said low rate by a control circuit including means coupled to said power line to divide the frequency thereof to produce a sub-multiple output signal for interrupting the driver.

5. A system as set forth in claim 1, wherein said compensating means includes a tertiary winding on said transformer and means to apply a constant current thereto to develop said counteracting magnetic flux.

6. A system as set forth in claim 1, wherein said compensating means includes a constant-current source whose output is applied to said secondary winding.

7. A system as set forth in claim 1, wherein said converter includes a divider which divides the detected flow rate signal by said reference voltage, and means to change the output voltage of the divider into a corresponding current to produce said output flow rate signal.

8. A system as set forth in claim 1, wherein said compensating means includes means interposed in said circuit means to detect fluctuations in the d-c component of the excitation current flowing therethrough to generate a compensating current dependent thereon.

9. A system as set forth in claim 8, wherein said compensating current is applied to said secondary winding.

10. A system as set forth in claim 8, further including a tertiary winding to which said compensating current is applied.

* * * * *

UNITED STATES PATENT OFFICE
CERTIFICATE OF CORRECTION

Patent No. 4,117,721         Dated October 3, 1978

Inventor(s) Kazuie Suzuki, Takashi Torimaru and Chuji Akiyama

It is certified that error appears in the above-identified patent and that said Letters Patent are hereby corrected as shown below:

Column 3, line 31 "whfich" should have read -- which --

Column 5, line 44 "output" should have read -- current --

Signed and Sealed this

*Twenty-sixth* Day of *December 1978*

[SEAL]

Attest:

RUTH C. MASON
*Attesting Officer*

DONALD W. BANNER
*Commissioner of Patents and Trademarks*